Oct. 28, 1969   R. E. McKINNEY ET AL   3,474,935
FERTILIZER APPLICATOR VEHICLE
Filed Dec. 6, 1967   2 Sheets-Sheet 1

INVENTORS
RALPH E. McKINNEY
ARTHUR A. BAUERS
BY
*Olsen and Stephenson*
ATTORNEYS

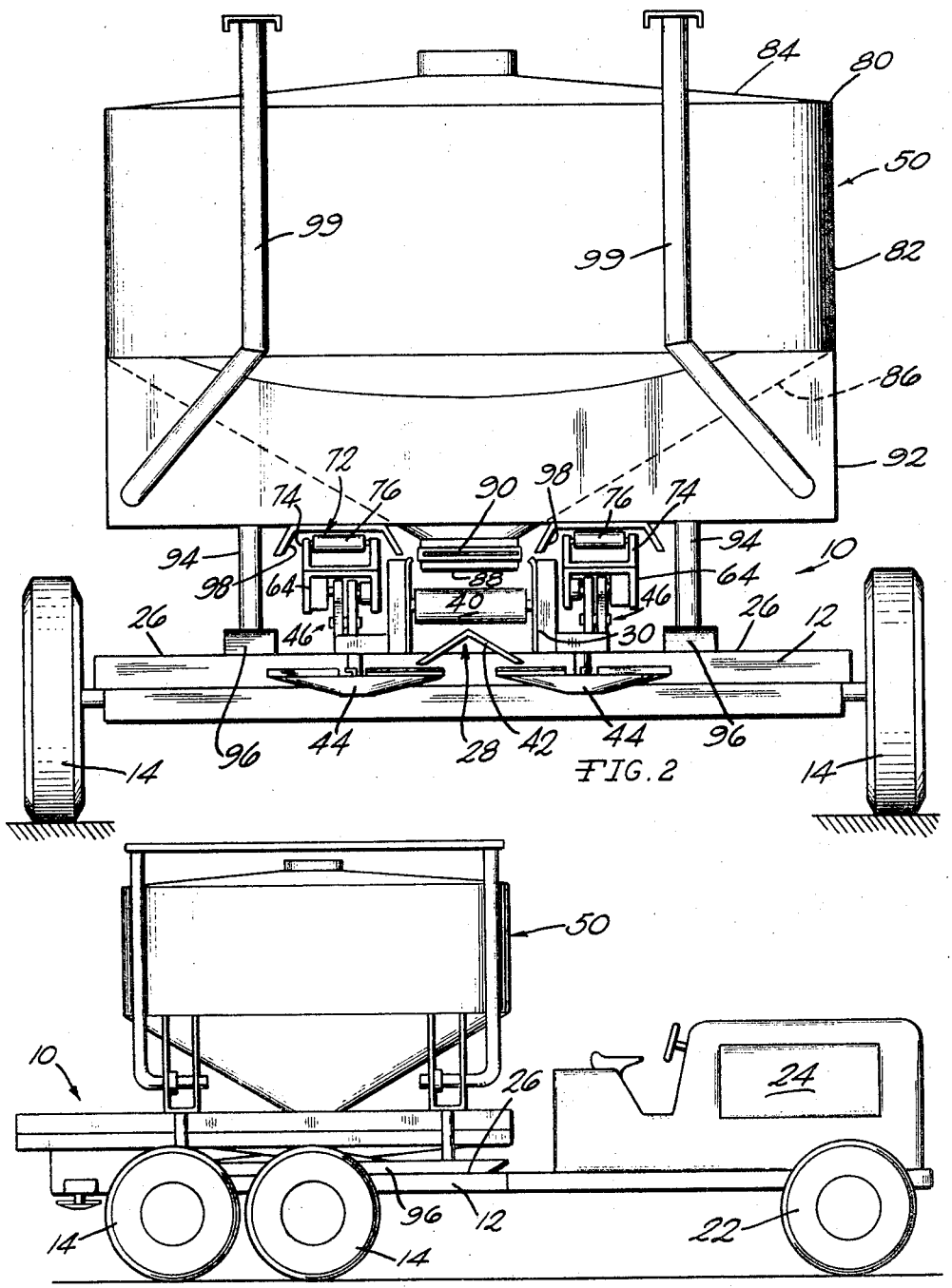

United States Patent Office 3,474,935
Patented Oct. 28, 1969

3,474,935
FERTILIZER APPLICATOR VEHICLE
Ralph E. McKinney, Beatrice, Nebr., and Arthur A. Bauers, Lenox, Iowa, assignors to Hoover Ball and Bearing Company, Saline, Mich., a corporation of Michigan
Filed Dec. 6, 1967, Ser. No. 688,463
Int. Cl. A01c *15/00*
U.S. Cl. 222—178         10 Claims

ABSTRACT OF THE DISCLOSURE

A vehicle consisting of a wheeled chassis which can either be towed or self-propelled, a distributor assembly mounted on the chassis for receiving bulk fertilizer and dispersing this fertilizer onto a field over which the vehicle is travelling, and a load supporting surface on the chassis for supporting a bin containing bulk fertilizer in a position in which fertilizer can flow from the bin into the distributor assembly. Lift structure is provided on the vehicle at a position engageable with the bin assembly for raising and lowering binds during removal of an empty bin from the vehicle and the installation of a loaded bin onto the vehicle. A roller conveyor is also disclosed associated with the lift structure to enable horizontal movement of a bin assembly to further facilitate movement of bins to and from the vehicle.

CROSS REFERENCE TO RELATED APPLICATIONS

Figure 1:
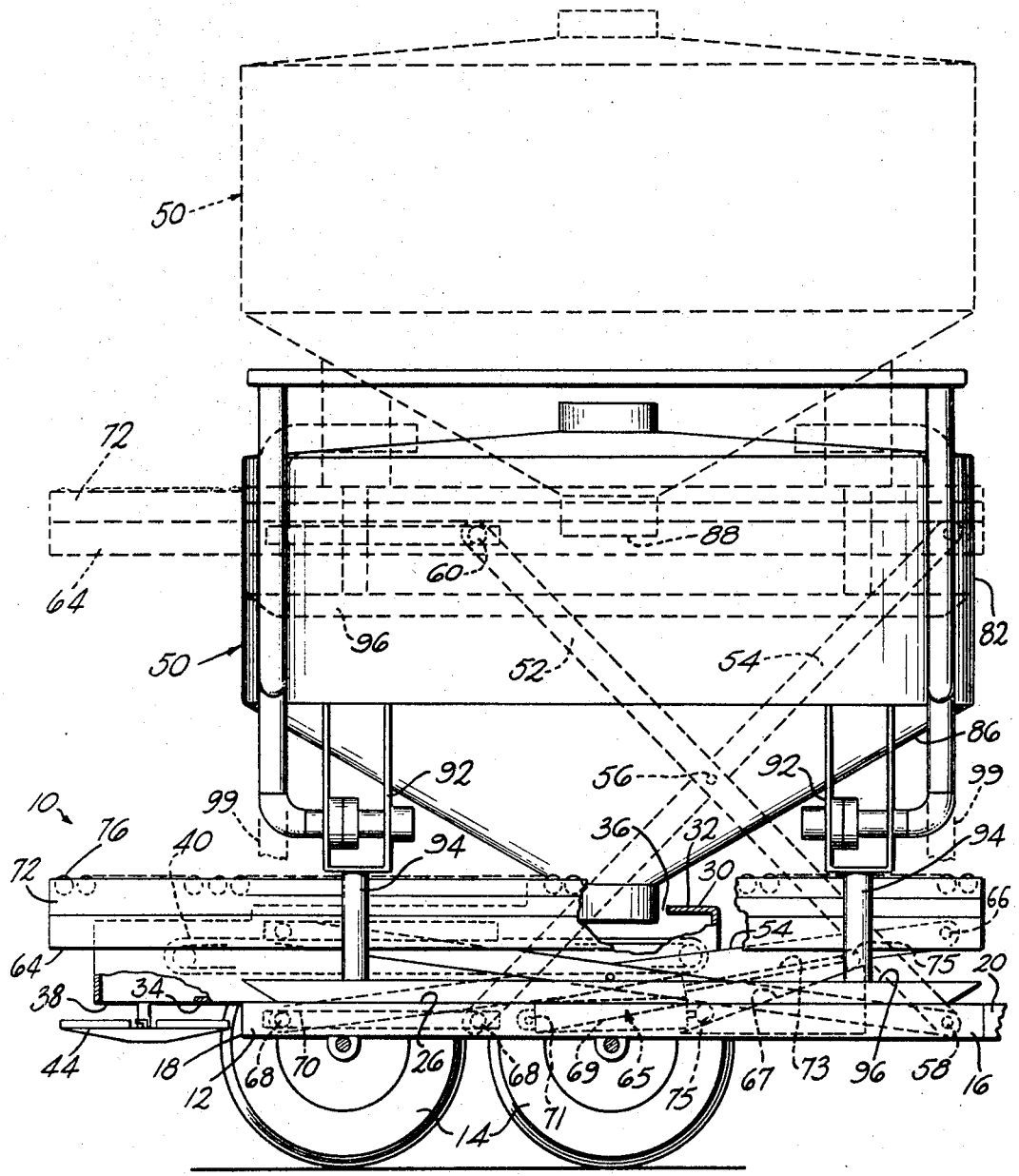

The vehicle of this invention forms a part of a material distribution system disclosed in copending application Ser. No. 681,532, filed Nov. 8, 1967, and is particularly adapted for use with bin assemblies of the type disclosed in copending application Ser. No. 681,531, filed Nov. 8, 1967. Both applications are assigned to the assignee of this application.

BACKGROUND OF THE INVENTION

Dry bulk fertilizer is conventionally applied to a field by either towing or driving a spreader vehicle, equipped with an integral fertilizer containing box, back and forth across the field. These vehicles are necessarily heavy, bulky, and expensive because of the relatively large capacity box which is built into the vehicle for containing the fertilizer and directing the fertilizer flow into the usual conveyor which discharges the fertilizer. In addition, such spreader equipment must be periodically refilled which necessitates either a return trip to the farm center where the fertilizer is supplied or a special trip from the farm center to the field with a truck capable of transferring its fertilizer contents to the spreader.

It is an object of this invention, therefore, to provide an improved fertilizer applicator vehicle which does not require a fertilizer containing box because it is usable with removable bins which function the same as the conventional box when mounted on the vehicle.

SUMMARY OF THE INVENTION

The fertilizer applicator vehicle of this invention consists of a wheeled chassis on which a fertilizer distributor assembly is mounted. Lift structure on the vehicle capable of moving a full bin into a supported position on the vehicle in which the bin contents can flow by gravity into the distributor assembly which disperses the fertilizer over the field. When the bin has been fully discharged of its contents, the lift structure is operable to remove the empty bin and move a fully loaded replacement therefor into a supported position on the vehicle so that the fertilizing operation can be continued without substantial interruption.

Further objects, features and advantages of this invention will become apparent from a consideration of the following description, the appended claims, and the accompanying drawing in which:

FIGURE 1 is a fragmentary side elevational view of the applicator vehicle of this invention, showing the vehicle components and a bin assembly in solid lines in an operative supported position of the bin assembly on the vehicle, and showing the vehicle components and the bin assembly in dotted lines during movement of the bin assembly onto or off the vehicle, with some parts broken away and other parts shown in section for the purposes of clarity;

FIGURE 2 is a rear elevational view of the vehicle of this invention, with a bin assembly mounted thereon, with some parts of the vehicle removed for purposes of clarity; and FIGURE 3 is a side elevational view of the self-propelled form of the vehicle of this invention with a bin assembly supported thereon in a position to deliver fertilizer to the vehicle.

With reference to the drawing, the fertilizer applicator vehicle of this invention, indicated generally at 10, is illustrated as including a chassis 12 mounted on ground wheels 14 and having a front end 16 and a rear end 18. The front end 16 of the chassis 12, can, according to this invention, be connected either to a tongue 20 (FIG. 1) drawn by a towing tractor (not shown) or it can be supported on added front wheels 22 and support an engine 24, as shown in FIG. 3, so as to make the vehicle 10 self-propelled. In either event, the structure of the applicator vehicle 10 is substantially the same.

The chassis 12 is provided with a flat load supporting surfaces 26 disposed on transversely opposite side of a distributor assembly 28, as shown in FIG. 2. The distributor or assembly 28 includes a hollow body 30 which extends longitudinally of the chassis 12 and has a top wall 32 and a bottom wall 34. An inlet opening 36 for the body 30 is formed in the top wall 32 adjacent the front end of the body 30 and an outlet opening 38 is formed adjacent the rear end of the body 30. An endless chain or belt type conveyor 40 in the body 30 is operable to move fertilizer delivered to the inlet opening 36 to the outlet opening 38. At the outlet opening 38, the fertilizer delivered by the conveyor 40 is directed by a deflector assembly 42 onto a pair of spinner disks 44, of well known construction, which rotate about vertical axes and function as impellers for dispersing the fertilizer onto a field over which the chassis 12 is traveling.

A pair of lift units 46 are mounted on the support surfaces 26 on transversely opposite sides of the distributor assembly 28 for moving a bin assembly 50, which is described in detail in the aforementioned copending application Ser. No. 681,531, toward and away from the inlet opening 36. Each lift unit 46 includes a pair of scissors arm members 52 and 54 which are pivotally connected intermediate their ends by a pin 56. The lower end of the arm 52 in each unit is pivotally connected by a pin 58 to the chassis 12 and the upper end of the arm 52 carries a roller 60 which is slidably supported in a horizontal extending slot 62 in an inverted U-shape frame member 64. The frame member 64 is also pivotally connected by a pin 66 to the top end of the scissors arm 54 which, at its lower end, carries a roller 68 that is slidably supported in a slot 70 in the chassis 12. It can thus be seen that in each lift unit 46, when the scissors arms 52 and 54 are relatively folded, the framemember 64 is in a lower position as shown in solid lines in FIG. 1 and when the scissors arms 52 and 54 are unfolded, the frame member 64 is movable to its upper position shown in broken lines in FIG. 1.

The scissors arm members 52 and 54 are unfolded, in each lift unit 46, by actuating a hydraulic cylinder assembly 65 which cooperates with an inclined ramp surface 67. The cylinder assembly 65 includes a cylinder 69 pivotally attached, by means of a pin 71, at one end to the chassis 12 and provided at the opposite end with an extensible piston rod 73 which carries a roller 75 that rolls on the ramp surface 67 and is engaged with the arm 52. As the roller 75 is moved up the ramp surface 67, it applies a force to the scissors arm 52 which moves the arm 52 in a clockwise direction as viewed in FIG. 1 about the pin 58 so as to move the arm 52 upwardly. The pivot connection 56 between the arm 52 and the arm 54 provides for a corresponding upward movement of the arm 54. When pressure is relieved in the cylinder assembly 65, the weight of the arms 52 and 54 and the frame members 64 will move the roller 75 in a reverse direction down the ramp surface 67 to allow the arms to assume the folded position shown in FIG. 1.

In the illustrated embodiment of the invention, a roller conveyor 72 is mounted on and secured to the top side of the frame member 64 in each lift unit 46. The roller conveyor 72 consists of a U-shape frame member 74 secured to the frame member 64 and a plurality of cylindrical rollers 76 rotatably mounted on the frame member 74.

The bin assembly 50 includes a container 80 having a tubular upper portion 82 provided with a top wall 84 and a frustoconical hopper shape bottom portion 86 which terminates at its lower end in a discharge opening 88. A slide gate 90 is mounted on the hopper portion 86 for movement to open and closed positions with respect to the discharge opening 88. The container 80 is supported on U-shape frame members 92 which extend transversely of the chassis 12 as shown in FIGS. 1 and 2. Four support members or legs 94 extend downwardly from the frame members 92, with pairs of the support members 94 being connected by elongated skids 96 which extend longitudinally of the chassis 12.

A pair of force transmitting members or plates 98 are secured to the bottom ends of the frame members 92 so that they are positioned on opposite sides of the discharge opening 88 and are spaced apart a distance corresponding substantially to the transverse spacing of the lift units 46. As a result, when a bin assembly 50 is located in a position in which the discharge opening 88 is in substantial vertical alignment with the distributor inlet opening 36, the force transmitting plates 98 are in substantial vertical alignment with the roller conveyors 72 for the lift units 46. In this position, the skids 96 are located above the support surfaces 26.

The bin assembly 50 is also equipped with ground support legs 99, which are considerably longer than the support members 94 and are movable between the upwardly extended folded positions shown in FIG. 2 and downwardly extending unfolded operative positions shown in broken lines in FIG. 1. Thus, as particularly described in the aforementioned copending applications the bin assembly 50 is movable between positions in which it is supported on the skids 96 during transport, and positions supported on the legs 99 during storage of the bin contents. To move the bin assembly 50 from a position supported on the skids 96 to a ground supported position on the legs 99, the bin assembly 50 is first moved upwardly, by use of the lift units 46, to a position in which the legs 99 can be swung to their downwardly extended positions shown in broken lines in FIG. 1, without engaging the ground surface with the legs 99. The legs 99 are then locked in their downwardly extended positions and the lift units 46 are operated to lower the bin assembly 50 to a ground supported position. The lift units 46 are then further lowered into clearance relation with the bin assembly 50 so that the vehicle 10 can be moved out from under the then ground supported bin assembly 50.

In the operation of the vehicle 10, assume that a bin assembly 50, loaded with dry bulk fertilizer, is supported on the support surfaces 26 as shown in full lines in FIG. 1 and FIG. 2. Movement of th slide gate 90 to the open position provides for flow of fertilizer, under the action of gravity, from the container hopper portion 86 into the distributor body 30 through the inlet opening 36. The conveyor 40 and the spinner disks 44 are driven, during movement of the vehicle 10 across field to be fertilized so that fertilizer is continually moved from the inlet opening 36 through the outlet opening 38 and onto the spinner disks 44 which disperse the fertilizer on the field. When the bin assembly 50 is empty, the vehicle 10 is driven to a position in proximity to another bin assembly 50 which is loaded with fertilizer. The lift units 46 are then operated to move the lift unit frame members 64 upwardly to in turn move the bin assembly 50 upwardly to its broken line position shown in FIG. 1. Such movement is effected by supplying fluid under pressure to the cylinder assemblies 65 either from a pump on the towing tractor (not shown) or a pump driven by the engine 24 when the vehicle 10 is a self-propelled form illustrated in FIG. 3.

When the bin assembly 50 has been moved to its upper position, the legs 99 are swung to their downwardly extending positions shown in broken lines in FIG. 1, and the fluid in the cylinder assemblies 65 is connected to tank, thereby allowing the force of gravity to move the lift units 46 downwardly. The lift units 46 are then further moved downwardly into a clearance relation with the bin assembly 50 so that the vehicle 10 can be driven out from under the bin assembly 50. The vehicle 10 is then backed under a loaded bin assembly 50 which is ground supported, to a position in which the inlet opening 36 is substantially aligned with the bin discharge opening 88. The lift units 46 are operated to engage the force transmitting plates 98 on the loaded bin, lift the bin sufficiently to clear the legs 99 from the ground surface, and lower the bin 50 into the position illustrated in FIG. 2 in which the skids 96 are supported on the surfaces 26. The above-described cycle of operation can then be repeated the necessary number of times to complete the fertilizing of the field.

The roller conveyor 72 is useful in moving the bin assembly 50 in a horizontal direction to insure alignment of the bin discharge opening 88 with the distributor inlet opening 36. The roller conveyor 72 is also useful in the event the bin assembly 50 can be moved to or from another roller conveyor (not shown) which is aligned with the roller conveyor 72 when it is in its upper position shown in broken lines in FIG. 1. Thus, the roller conveyor 72 is particularly useful in th event the delivery vehicle which takes bins to and from the field on which the applicator vehicle 10 is operating is equipped with a similar roller conveyor.

From the above description it is seen that this invention provides a simple, small and inexpensive fertilizer applicator vehicle which does not require a large body in which the fertilizer is contained. These desirable advantages are obtained by virtue of the construction of the vehicle 10 so that it can utilize the bin assembly 50 as its fertilizer containing body.

What is claimed is:
1. A fertilizer applicator vehicle comprising a wheeled chassis,
 a distributor assembly on said chassis operable to receive bulk fertilizer and disperse said fertilizer onto a field over which said chassis is traveling,
 a load supporting surface on said chassis adjacent said assembly,
 a bin assembly supported on said surface and having a discharge opening located so that bulk fertilizer in said bin assembly can flow to said distributor assembly, and
 lift means on said chassis engageable with said bin assembly for raising and lowering the bin assembly relative to said distributor assembly during removal of an empty bin assembly from said chassis and movement of a loaded bin assembly onto said support surface.

2. An application vehicle according to claim 1 wherein said distributor assembly includes a hollow body extending longitudinally of said chassis and having an inlet opening adjacent one end and an outlet opening adjacent the opposite end, conveyor means in said body extending between said inlet and outlet opeings for moving fertilizer delivered to said inlet opening to said outlet opening, and impeller means adjacent said outlet opening operable to disperse fertilizer received therefrom.

3. An applicator vehicle according to claim 2 wherein said load supporting surface is disposed on transversely opposite sides of said distributor assembly.

4. An applicator vehicle according to claim 3 wherein said lift means includes pivoted arms secured to said chassis and movable in upright planes, and means secured to the upper ends of said arms and engageable with said bin assembly on upward movement of said arms so as to apply a lifting force to said bin assembly.

5. A fertilizer applicator vehicle comprising a wheeled chassis,
   a distributor assembly on said chassis operable to receive bulk fertilizer and disperse said fertilizer onto a field over which said chassis is traveling,
   a load supporting surface on said chassis adjacent said assembly,
   a bin assembly removably supported on said surface and having a discharge opening located so that bulk fertilizer in said bin assembly can flow to said distributor assembly, and
   lift means on said chassis engageable with said bin assembly for raising and lowering the bin assembly relative to said distributor assembly during removal of an empty bin assembly from said chassis and movement of a loaded bin assembly onto said support surface.

6. An applicator vehicle according to claim 1 wherein said lift means includes hydraulically actuatable extensible units.

7. An applicator according to claim 1 further including drive means on said chassis for propelling said vehicle.

8. A vehicle comprising a wheeled chassis, a hollow body on said chassis extending longitudinally thereof and having a top side, said body having an inlet opening in said top side and an outlet opening, conveyor means in said body extending between said inlet and outlet openings, and vertically movable lift means on said chassis on transversely opposite sides of said body.

9. A vehicle according to claim 8 further including substantially horizontal load supporting surfaces on said chassis on transversely opposite sides of said body for supporting a container in a position in which material can flow therefrom into said inlet opening.

10. A vehicle according to claim 8 further including hydraulic power means for actuating said lift means.

References Cited
UNITED STATES PATENTS

| | | | |
|---|---|---|---|
| 2,185,415 | 1/1940 | Miles | 222—178 |
| 2,779,508 | 1/1957 | Ensinger | 222—178 |
| 3,043,455 | 7/1962 | Post | 214—515 X |
| 3,119,503 | 1/1964 | Herpich et al. | 214—515 X |
| 3,266,648 | 8/1966 | Hackett et al. | 222—178 X |
| 3,366,281 | 1/1968 | Wilder | 222—178 X |

STANLEY H. TOLLBERG, Primary Examiner

U.S. Cl. X.R.

214—515